F. B. HAYS.
METHOD OF MAKING COMPOSITION CONTAINERS.
APPLICATION FILED JUNE 8, 1912.
1,149,440.  Patented Aug. 10, 1915.
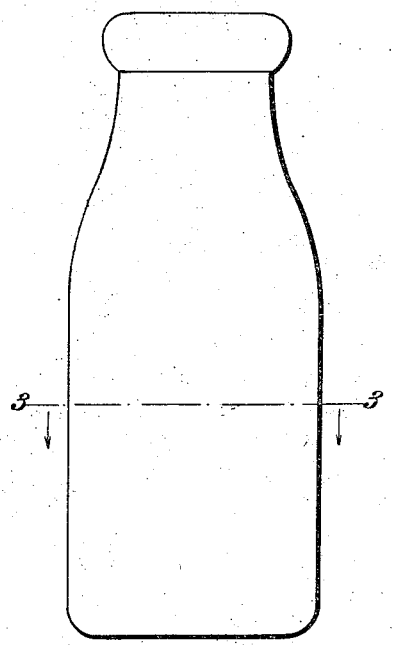
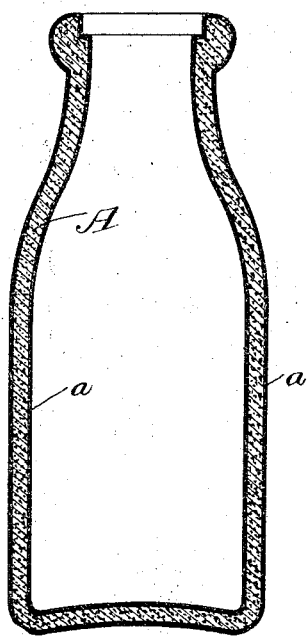
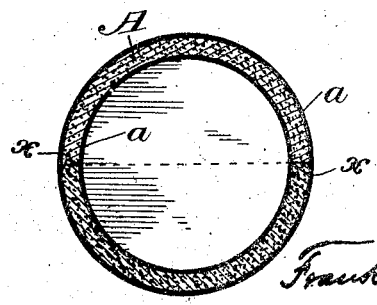
Witnesses
J. A. Braddock.
Inventor,
Franklin B. Hays,
By Bradford & Doolittle,
Attorneys

UNITED STATES PATENT OFFICE.

FRANKLIN B. HAYS, OF INDIANAPOLIS, INDIANA, ASSIGNOR OF ONE-HALF TO RUFUS K. SYFERS, OF INDIANAPOLIS, INDIANA.

METHOD OF MAKING COMPOSITION CONTAINERS.

1,149,440.  Specification of Letters Patent.  Patented Aug. 10, 1915.

Application filed June 8, 1912. Serial No. 702,509.

*To all whom it may concern:*

Be it known that I, FRANKLIN B. HAYS, a citizen of the United States, residing at Indianapolis, Marion county, and State of Indiana, have invented and discovered certain new and useful Improvements in Methods of Making Composition Containers, of which the following is a specification.

My said invention consists in the manufacture of bottles, jars, and such like containers, from a specially prepared composition, and in the particular process of said manufacture, whereby such an article is produced at comparatively small expense and one that is practically indestructible and at the same time capable of all uses for which glass containers of such a character are employed, excepting such uses as may require transparent vessels, all as will be hereinafter more fully described and claimed.

In the accompanying drawings I have illustrated a bottle of the form and style ordinarily used for milk bottles, Figure 1 being a perspective view of such a bottle, Fig. 2 a central vertical section, and Fig. 3 a cross section thereof on the dotted line 3—3 in Fig. 1.

Said containers are composed of a composition consisting of sawdust and "water-glass" or sodium silicate.

In the manufacture of said containers I have found that substantially equal quantities of the sawdust and sodium silicate, measured by weight, give very satisfactory, perhaps the most satisfactory, results, although the exact proportion may be varied without materially changing the results and, under some conditions, should be varied, to secure the desired results in the most perfect manner. The two substances are mixed in a suitable vat, or receptacle, by any form of agitator, until the sawdust is thoroughly saturated by the water-glass or sodium silicate, the whole mass then becoming a thick sticky mixture of a consistency capable of molding. The mixture is then molded under pressure to the form desired and this molding may be accomplished in various ways. A suitable mold for forming the character of container desired is filled with the substance and pressure applied varying from three to ten thousand pounds per square inch. Under this pressure the substance becomes of a homogeneous but jelly-like consistency and is then placed in a dry room and allowed to dry and harden slowly. The room used for such purpose should be thoroughly dry and of a temperature approximately 70° Fahr. The molded articles are allowed to stand in such a room until thoroughly cured. The period of time required for this curing process is usually several days and in some cases it may require as long as two or three weeks before all of the moisture is evaporated and the articles thoroughly hardened. When this stage in the manufacture has been reached, the articles may, if not of the exact shape desired, be placed in a lathe and turned, as wooden blocks might be turned, to secure the exact exterior form and design of body A preferred. After this step, the articles are coated with some substance which will make them impervious to moisture and to the particular liquid which it is intended to store therein. For example, in the case of milk bottles, they are dipped in paraffin, which makes a coating, a very desirable for the purpose. For use with fluid to be bottled at a high temperature, some substance capable of resisting the temperature would be substituted for the paraffin coating.

The slow drying process is essential inasmuch as if dried in a dry room of high temperature and dried quickly the surface will first harden and confine the moisture to the interior of the substance and cause the article to crack in further drying. If placed in a room of too low temperature the substance will absorb the moisture in the air and drying under such conditions would become impossible.

The degree of pressure under which the molding is done may vary considerably but must be sufficient to cause a perfect adhesion between all the particles of the mixtures so as to form a homogeneous body and reduce the whole to a jelly-like consistency. If the pressure is not sufficient this result will not be accomplished, while if the pressure is too high the particles of sawdust will become crushed and lose their quality of a binder in the substance which is essential. I have found that approximately 5000 lbs. pressure produces the best results but that it may vary from 3000 lbs. to 10000 lbs. and still be practical. It is also possible to reduce the mixture to a jelly-like consistency by means of subjecting it to successive pressure under a series of rollers, rolling it until it is reduced to the proper consistency and to sheets of appropriate thickness which when finished are of a tough consistency, substantially like soft gutta-percha, or gutta-percha which has been slightly heated, in which condition the articles can be formed by appropriate dies.

In Fig. 3 I have indicated by the line x—x a central division and in forming the bottles by this means they would be formed in two substantially equal parts and the edges of the two parts immediately after formation dipped in sodium silicate and placed together and then placed in a spring holder, or form, and taken to the dry room and allowed to cure. When thoroughly dried the two parts become substantially integral as will be readily understood. The drying and coating then proceeds as before described.

Other modifications in the method of forming the bottles or other vessels may be devised which will be entirely practical and I, therefore, do not desire to be limited to any specific method so far as it relates to details, but consider my invention to include the method and article, substantially as defined in the appended claim.

Having thus fully described my said invention what I claim as new and desire to secure by Letters Patent is:

The method of manufacturing bottles, etc., which consists in saturating a quantity of sawdust with sodium silicate in substantially equal quantities measured by weight and thoroughly mixing the same by agitation until the sawdust is completely saturated with sodium silicate, then molding the mixture thus formed into blanks suitable for the articles to be formed and subjecting the same to pressure until the whole is reduced to a homogeneous substance of jelly-like consistency, then curing the same by drying in a room of a comparatively low temperature to avoid undue rapidity of evaporation, and then coating the article formed with a moisture resisting substance, substantially as set forth.

In witness whereof, I have hereunto set my hand and seal at Indianapolis, Indiana, this twenty-second day of May, A. D. nineteen hundred and twelve.

FRANKLIN B. HAYS. [L. S.]

Witnesses:
E. W. BRADFORD,
A. C. RICE.

Copies of this patent may be obtained for five cents each, by addressing the "Commissioner of Patents, Washington, D. C."